United States Patent
Kurokawa et al.

(10) Patent No.: US 9,446,782 B2
(45) Date of Patent: Sep. 20, 2016

(54) TELESCOPIC SHAFT AND MANUFACTURING METHOD THEREOF

(75) Inventors: Yoshifumi Kurokawa, Gunma (JP); Shin Mihara, Gunma (JP); Hiroyuki Hattori, Gunma (JP); Takuma Nakamura, Gunma (JP); Sho Inaki, Gunma (JP); Seiichi Moriyama, Gunma (JP); Yoshio Nakano, Gunma (JP)

(73) Assignee: NSK LTD., Tokyo (JP)

( * ) Notice: Subject to any disclaimer, the term of this patent is extended or adjusted under 35 U.S.C. 154(b) by 230 days.

(21) Appl. No.: 14/009,980

(22) PCT Filed: Jun. 25, 2012

(86) PCT No.: PCT/JP2012/066131
§ 371 (c)(1),
(2), (4) Date: Oct. 15, 2013

(87) PCT Pub. No.: WO2013/002169
PCT Pub. Date: Jan. 3, 2013

(65) Prior Publication Data
US 2014/0041194 A1 Feb. 13, 2014

(30) Foreign Application Priority Data

Jun. 29, 2011 (JP) .................................. 2011-144312

(51) Int. Cl.
*B62D 1/185* (2006.01)
*F16D 3/06* (2006.01)
*F16C 3/03* (2006.01)
*F16C 33/20* (2006.01)
*F16D 1/10* (2006.01)

(52) U.S. Cl.
CPC ................ *B62D 1/185* (2013.01); *F16C 3/03* (2013.01); *F16C 33/208* (2013.01); *F16D 3/06* (2013.01);
(Continued)

(58) Field of Classification Search
CPC ............ F16C 2223/30; F16C 2223/32; F16C 2226/16; F16C 2226/70; F16C 2226/76; F16C 2226/80; F16C 2326/24; F16C 3/03; F16C 33/208; F16C 2231/00; B62D 1/185; Y10T 29/4984; Y10T 29/49622; Y10T 29/49888
See application file for complete search history.

(56) References Cited

U.S. PATENT DOCUMENTS

2011/0034256 A1 2/2011 Tokioka

FOREIGN PATENT DOCUMENTS

| JP | 2004-66970 A | 3/2004 |
|---|---|---|
| JP | 2008-168890 A | 7/2008 |
| JP | 2009-121529 A | 6/2009 |
| JP | 2009-168194 A | 7/2009 |

(Continued)

OTHER PUBLICATIONS

International Search Report and Written Opinion dated Aug. 21, 2012 from the corresponding PCT/JP2012/066131.

*Primary Examiner* — Christopher Besler
(74) *Attorney, Agent, or Firm* — Katten Muchin Rosenman LLP

(57) ABSTRACT

Provided is a telescopic shaft having a coated section that reduces sliding resistance, with fluctuation of the sliding resistance according to sliding position of the telescopic shaft being reduced. A female shaft 16B is fitted onto a male shaft in a state of interference, and by causing the male shaft 16A to slide back-and-forth a specified number of times in the axial direction with respect to the female shaft 16B while applying, for example, a load in a direction that bends the male shaft 16A with respect to the female shaft 16B, friction heat is generated between side surfaces 411 of grooves 41 in the female shaft 16B and the coated section 61, which heats the coated section 61 and causes the coated section 61 to expand along the entire length in the axial direction of teeth 51 of the male shaft 16A. Therefore, the coated section 61 plastically deforms along the entire length in the axial direction of the teeth causing compressive strain to occur. By causing the male shaft 16A to slide back-and-forth with respect to the female shaft 16B in this state, the grooves 41 of the female shaft 16B and the teeth 51 of the male shaft 16A are uniformly in contact along the entire length in the axial direction, and thus sliding friction becomes constant along the entire length of the sliding range.

8 Claims, 15 Drawing Sheets

(52) U.S. Cl.
CPC ........ *F16C 2231/00* (2013.01); *F16C 2326/24* (2013.01); *F16D 2001/102* (2013.01); *F16D 2001/103* (2013.01); *F16D 2250/0023* (2013.01); *F16D 2300/10* (2013.01); *Y10T 29/4984* (2015.01)

(56) References Cited

FOREIGN PATENT DOCUMENTS

| JP | 2011-38561 A | 2/2011 |
| JP | 2011-111091 A | 6/2011 |

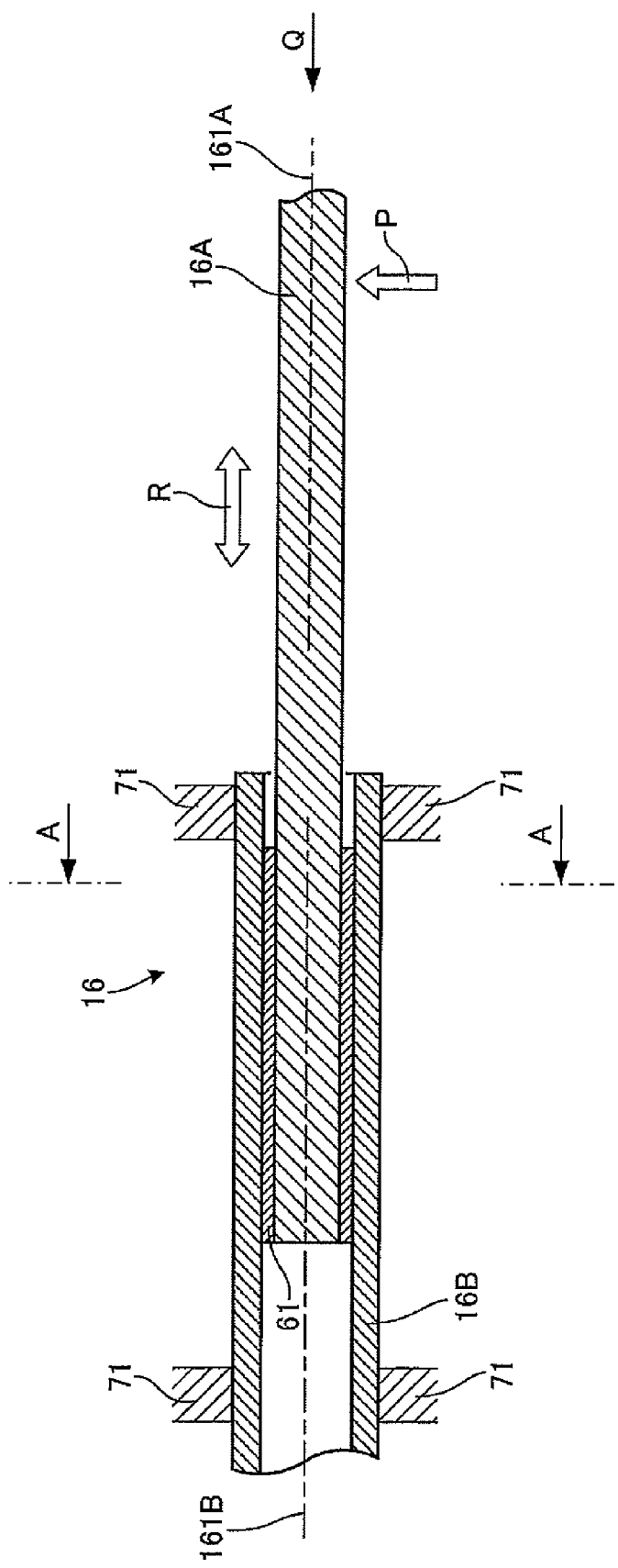

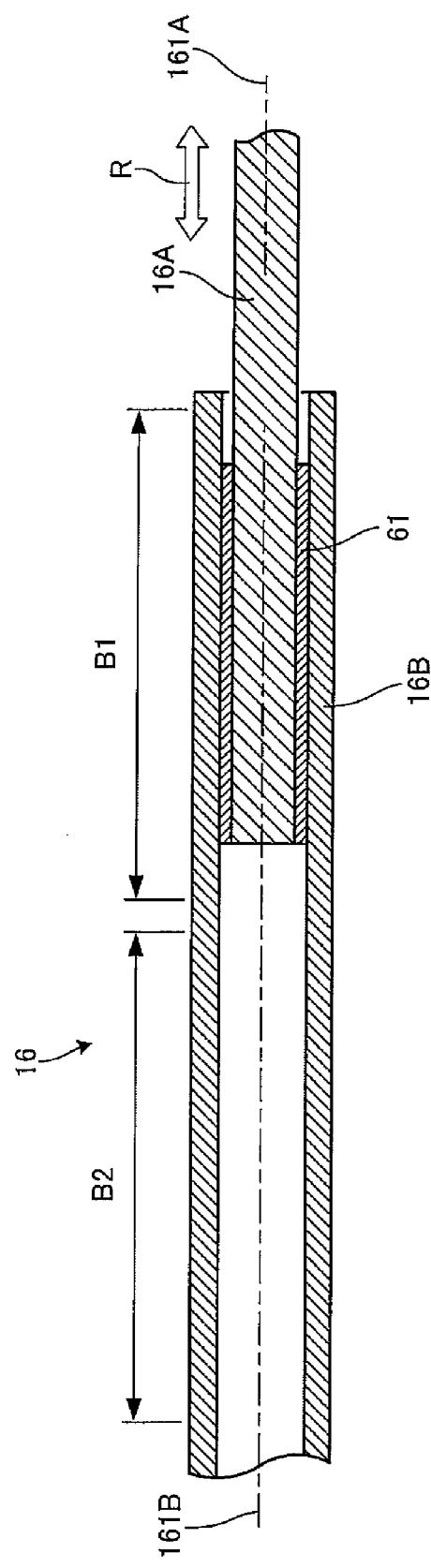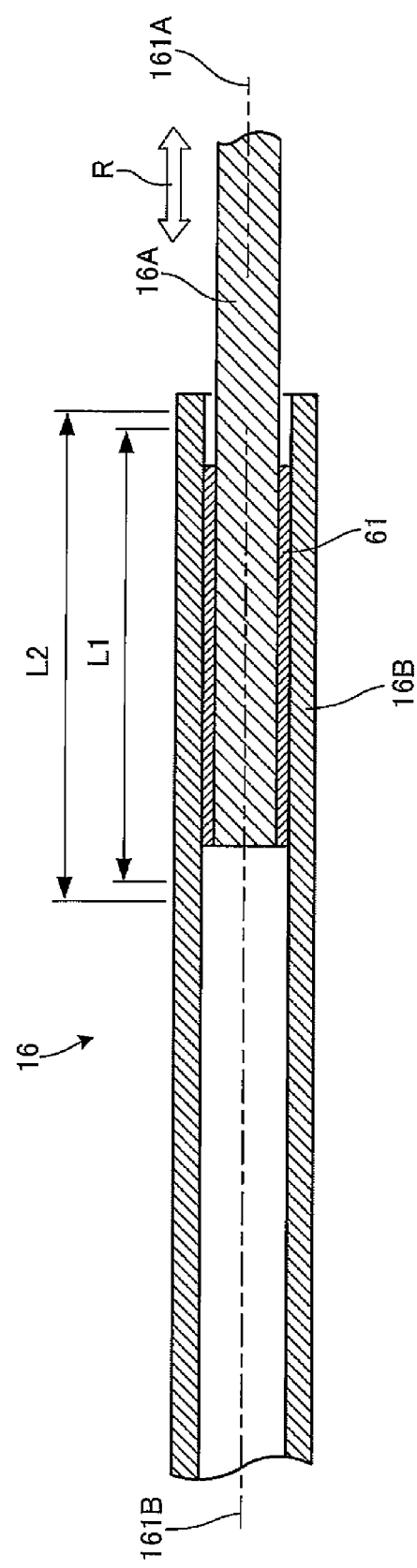

TELESCOPIC SHAFT AND MANUFACTURING METHOD THEREOF

TECHNICAL FIELD

The present invention relates to a telescopic shaft, and particularly to a telescopic shaft such as an intermediate shaft or steering shaft of a steering apparatus for an automobile that is capable of transmitting rotation torque as well as is capable of relative sliding movement in the axial direction, and to a manufacturing method thereof.

BACKGROUND ART

A telescopic shaft that is composed of spline shafts that are capable of transmitting rotation torque and are capable of relative sliding movement in the axial direction is assembled in a steering apparatus as an intermediate shaft, steering shaft or the like. More specifically, for an intermediate shaft, when connecting the universal joint thereof to a pinion shaft that engages with a rack shaft of a steering gear, it is necessary to fit the intermediate shaft itself with the pinion shaft after contraction the intermediate shaft, and furthermore, it is necessary to absorb the relative displacement between the intermediate shaft and the vehicle frame, the intermediate shaft is provided with a telescopic function. Moreover, a steering shaft is provided with a telescopic function for transmitting steering force from a steering wheel to the wheels and allowing the position of the steering wheel in the axial direction to be adjusted to match the physique and driving posture of the driver.

FIG. 15 illustrates an example of a conventional steering apparatus having this kind of telescopic shaft. This steering apparatus comprises: a steering shaft 12 onto which a steering wheel 11 can be mounted on the side toward the rear of the vehicle; a steering column 13 that with the steering shaft 12 inserted through it, supports the steering shaft 12 so as to be able to rotate; an assist apparatus (auxiliary steering unit) 20 for applying auxiliary torque to the steering shaft 12, and on the side toward the front of the vehicle of the steering shaft, an intermediate shaft and a steering gear 30 that are connected by way of a rack and pinion mechanism (not illustrated in the figure).

The steering shaft 12 is constructed by combining an outer shaft 12A and an inner shaft 12B such that rotation torque can be freely transmitted, and so that relative displacement in the axial direction is possible. In order for this, a plurality of male splines is formed around the outer circumference of the inner shaft 12B on the side toward the rear of the vehicle. A plurality of female splines is formed around the inner circumference of the outer shaft 12A on the side toward the front of the vehicle having the same phase positions as the male splines. By fitting the female splines of the outer shaft 12A with the male splines of the inner shaft 12B with a fit having a specified clearance gap, the outer shaft 12A and the inner shat 12B are fitted together such that rotation torque can be freely transmitted, and relative displacement in the axial direction is possible. With this construction, the outer shaft 12A and the inner shaft 12B are capable of relative sliding movement during a collision, such that the entire length of the steering shaft 12 is able to contract.

Moreover, a cylindrical steering column through which the steering shaft 12 is inserted is constructed by combining the outer column 13A and an inner column 13B so as to be able to expand and contract, and comprises collapsible construction wherein when an impact is applied in the axial direction during a collision, the entire length contracts while absorbing energy due to the impact.

The end section on the side toward the front of the vehicle of the inner column 13B is press fitted and fastened to the end section on the side toward the rear of the vehicle of a gear housing 21. Moreover, the end section on the side toward the front of the vehicle of the inner shaft 12B is inserted through the inside of the gear housing 21 and is connected to the end section on the side toward the rear of the vehicle of an input shaft (not illustrated in the figure) of the assist apparatus 20.

The middle section of the steering column 13 is supported by part of the vehicle 18 such as the bottom surface of the dashboard by a support bracket 14. A locking section (not illustrated in the figure) is provided between the support bracket 14 and the vehicle 18 so that when an impact is applied in a direction toward the front side of the vehicle, the support bracket 14 is able to separate from the locking section, and move toward the front side of the vehicle.

The top end section of the gear housing 21 is also supported by part of the vehicle 18. This conventional construction comprises a tilt mechanism and a telescopic mechanism, that make it possible to freely adjust the forward-backward position with respect to the vehicle (telescopic position) and the height position (tilt position) of the steering wheel 11. The construction of the telescopic mechanism and the tilt mechanism is well known, so a detailed explanation will be omitted here.

An output shaft 23 that protrudes from the end surface on the side toward the front of the vehicle of the gear housing 21 is connected to the rear end section of the male shaft 16A of the intermediate shaft 16 by way of a universal joint 15. Furthermore, the pinion shaft 31 of the steering gear 30 is connected to the front end section of the female shaft 16B of the intermediate shaft 30 by way of a different universal joint 17.

The male shaft 16A is connected to the female shaft 16B such that relative sliding movement in the axial direction is possible, and so that rotation torque can be transmitted. A pinion that is formed on the front end section of the pinion shaft 31 engages with a rack of a rack shaft (not illustrated in the figure), and rotation of the steering wheel 11 causes tie rods 32 to move by way of the steering gear 30, and steers the wheels (not illustrated in the figure).

The case 261 of an electric motor 26 is fastened to the gear housing 21 of the assist apparatus 20. The direction and size of the torque that is applied to the steering shaft 12 from the steering wheel 11 is detected by a torque sensor, and the electric motor 26 is driven according to this detected signal, making it possible to apply an auxiliary torque having a specified direction and specified size to the output shaft 23 by way of a reduction gear (not illustrated in the figure).

In order to sufficiently take full advantage of the expanding and contracting function in the axial direction of the telescopic shaft such as the intermediate shaft 8 and steering shaft 12, there is a need to reduce the sliding friction that occurs when there is sliding in the axial direction. On the other hand, in this kind of steering apparatus, when the steering wheel 11 is operated as the rigidity and operating stability of the entire vehicle is improved, it becomes easy for the driver to feel backlash movement in the direction of rotation of the telescopic shaft such as the intermediate shaft 16 or the steering shaft 12. Therefore, there is a need for a telescopic shaft that has both reduced backlash in the direction of rotation and the sliding friction, and that has excellent lubrication and durability.

For example, manufacturing of telescopic shaft is being performed wherein a coated section is provided by coating a synthetic resin or the like having small sliding friction on the outer circumference of the tooth surface of the male shaft, and furthermore, after applying a lubricant such as grease, the male shaft is fitted into the female shaft. By providing this kind of coated section, it is possible for the telescopic shaft to slide smoothly due to the self lubrication and flexibility of the resin material. However, in this kind of telescopic shaft, when the allowable range of the sliding resistance is narrow, it may become difficult to keep the sliding resistance within the allowable range due to the processing precision of the male shaft, female shaft and coated section.

A telescopic shaft disclosed in JP 2004-66970 (A) is such that when a female shaft is fitted with a male shaft in which a coated section as been provided, a rotation torque is applied by relatively twisting the male shaft and female shaft such that the inner teeth of the female shaft press against the coated section of the outer teeth of the male shaft, which causes the coated section to be compressed and hardened, and forms pressure dented surface on the coated section. As a result, a sliding clearance gap is maintained at a fixed amount over a long period of time, and by accumulating lubricant in the pressure dented surface, the supply of lubricant is performed well. However, in this telescopic shaft, a specified sliding resistance is obtained near the specified sliding position where rotation torque was applied and the coated section was compressed, however, it is difficult to obtain the specified sliding resistance along the entire length of the distance that the telescopic shaft slides.

As related art, JP 2008-168890 (A) discloses the use of a synthetic resin composition that includes a specified filler as the resin of the coated section, and JP 2011-111091 (A) discloses the use of a synthetic resin composition that has undergone crosslinking treatment as the resin of the coated section. Moreover, JP 2009-168194 (A) discloses a manufacturing method for a telescopic shaft in which the male shaft is caused to slide relatively in the axial direction with respect to the female shaft while heating the coated section to a specified temperature according to the sliding resistance before the intermediate shaft is broken in, in order to keep the sliding resistance with a specified narrow allowable range after the intermediate shaft has been broken in. The contents disclosed in JP 2004-66970 (A), JP 2008-168890 (A), JP 2011-111091 (A) and JP 2009-168194 (A) are incorporated into this specification by reference.

RELATED LITERATURE

Patent Literature

[Patent Literature 1] JP 2004-66970 (A)
[Patent Literature 2] JP 2008-168890 (A)
[Patent Literature 3] JP 2011-111091 (A)
[Patent Literature 4] JP 2009-168194 (A)

SUMMARY OF THE INVENTION

Problem to be Solved by the Invention

The object of the present invention is to provide a telescopic shaft having a coated section for reducing the sliding resistance, and that has little fluctuation in sliding resistance depending on the sliding position.

Means for Solving the Problems

The present invention relates to a manufacturing method for a telescopic shaft that has: a male shaft having a non-circular outer circumferential shape; a female shaft having a non-circular inner circumferential shape, that fits around the male shaft so that relative sliding movement in the axial direction is possible, and so that rotation torque can be transmitted; and a coated section that is formed on the outer circumferential surface of the male shaft or the inner circumferential surface of the female shaft, and reduces sliding resistance between the male shaft and the female shaft.

Particularly, the manufacturing method for a telescopic shaft of the present invention comprises the steps of:

forming a coated section on the outer circumferential surface of the male shaft or the inner circumferential surface of the female shaft, the coated section having a thickness that has a sliding resistance that is at least greater than the lower limit value of an allowable range for a specified sliding resistance, and that generates interference when the female shaft is fitted onto the male shaft;

fitting the female shaft onto the male shaft after the coated section has been formed such that the shafts are in a state of interference; and causing the male shaft to slide back-and-forth a specified number of times in the axial direction with respect to the female shaft, causing the coated section to be heated and expand by the friction heat that is generated due to the interference, and causing the coated section to plastically deform, which reduces the interference and sets the sliding resistance between the male shaft and the female shaft within the specified allowable range for the sliding resistance.

Preferably, grease having hardness in the range of NLGI consistency number of class 1 to class 3, is filled between the coated section and the inner circumferential surface of the female shaft or the outer circumferential surface of the male shaft, and the male shaft is caused to relatively slide back-and-forth in the axial direction with respect to the female shaft.

Alternatively or additionally, it is preferred that the male shaft be caused to relatively slide back-and-forth in the axial direction with respect to the female shaft, while applying a load in a direction that relatively bends the male shaft with respect to the female shaft.

Alternatively, it is preferred that the male shaft be caused to relatively slide back-and-forth in the axial direction with respect to the female shaft, while a load in a direction that causes the center axis line of the male shaft to shift with respect to the center axis line of the female shaft is applied to the male shaft.

Alternatively or additionally, it is preferred that the male shaft be caused to relatively slide back-and-forth in the axial direction with respect to the female shaft, while a rotation torque is applied between the female shaft and the male shaft.

Alternatively or additionally, it is preferred that the male shaft be caused to relatively slide back-and-forth in the axial direction with respect to the female shaft, while a load in a direction reducing the diameter of the inner circumference of the female shaft is applied to the female shaft.

Alternatively or additionally, it is preferred that the coated section be caused to melt by friction heat that is generated by causing the male shaft to relatively slide back-and-forth in the axial direction with respect to the female shaft a plurality of times.

Additionally, it is preferred that the sliding speed, the sliding surface pressure and the sliding distance, at which the male shaft will be caused to relatively slide back-and-forth in the axial direction with respect to the female shaft, be changed according to the value of the sliding resistance after the male shaft has been caused to relatively slide back-and-forth in the axial direction with respect to the female shaft a specified number of times.

Additionally, it is preferred that the male shaft be caused to relatively slide back-and-forth in the axial direction with respect to the female shaft, while heating the coated section with a heating apparatus.

With the manufacturing method for a telescopic shaft of the present invention, a telescopic shaft is obtained, the sliding resistance thereof being constant along the entire length of the sliding range, with the fluctuation in sliding resistance in the axial direction according to the sliding position being within the range of 0% to 20%.

Effect of the Invention

With the manufacturing method for a telescopic shaft of the present invention by forming a coated section having a thickness that has a sliding resistance that is at least greater than the lower limit value of an allowable range for a specified sliding resistance, and that generates interference when the female shaft is fitted around the outside of the male shaft, the coated section, during the process of causing the male shaft to slide back-and-forth with respect to the female shaft, is heated by the friction heat of the male shaft with respect to the female shaft, and expands, which causes compressive strain to occur. In this state, the grooves of the female shaft and the teeth of the male shaft come in uniform contact along the entire length in the axial direction. Therefore, it becomes possible to provide a telescopic shaft having sliding resistance that is constant over the entire length of the sliding range.

BRIEF DESCRIPTION OF THE DRAWINGS

FIG. 1 is a vertical cross-sectional view illustrating the manufacturing process of a telescopic shaft of a first example of an embodiment of the present invention.

FIG. 2A illustrates an example of a telescopic shaft in which a resin sleeve is provided, and FIG. 2B illustrates an example of a telescopic shaft having a resin coated section.

FIGS. 6A and 6B illustrate an alternative version of the first example of an embodiment of the present invention. FIG. 6A is a vertical cross-sectional view illustrating a manufacturing process of a telescopic shaft in a range B1, wherein the male shaft 16A is caused to slide back-and-forth with respect to the female shaft during manufacturing, is set so as to be different than a range B2, wherein the male shaft 16A is caused to slide back-and-forth with respect to the female shaft 16 during assembly in the vehicle, and FIG. 6B is a vertical cross-sectional view illustrating a manufacturing process of a telescopic shaft in which a distance L1 through which the male shaft 16A is caused to slide back-and-forth with respect to the female shaft 16B during manufacturing is set so as to be different than a distance L2 through which the male shaft 16A is caused to slide back-and-forth with respect to the female shaft 16B during assembly in the vehicle.

FIG. 7A illustrates an example of a load in a bending direction that is applied from a plurality of angular positions in the circumferential direction of the male shaft, and FIG. 7B is a view in the direction of arrow Q and illustrates an example of continuously changing the direction of the load in the bending direction that is applied around the circumferential direction of the male shaft.

FIG. 9A illustrates an example of applying a load in a direction that offsets the center axis line from a plurality of angular positions in the circumferential direction of the male shaft, and FIG. 9B is a view that illustrates an example of continuously changing the direction of the load a direction that offsets the center axis line that is applied around the circumferential direction of the male shaft.

FIG. 11A illustrates an example of applying a rotation torque in the counterclockwise direction after a rotation torque has been applied in the clockwise direction, and FIG. 11B illustrates an example of alternately and repeatedly applying a rotation torque in the clockwise direction and counterclockwise direction.

MODES FOR CARRYING OUT THE INVENTION

In the following, an embodiment of the present invention will be explained in detail with reference to the drawings, while giving examples of applying the present invention to an intermediate shaft of a steering apparatus for an automobile.

EXAMPLE 1

FIG. 1 illustrates an intermediate shaft of a first example of an embodiment of the present invention. The intermediate shaft 16 is constructed by fitting the side toward the front of the vehicle (left end in FIG. 2) of a male shaft 16A inside the side toward the rear of the vehicle (right end in FIG. 1) of a female shaft 16B, and connecting the male shaft (male spline shaft) 16A and female shaft (female spline shaft) 16B such that relative sliding movement between them is possible.

Figure 2A:
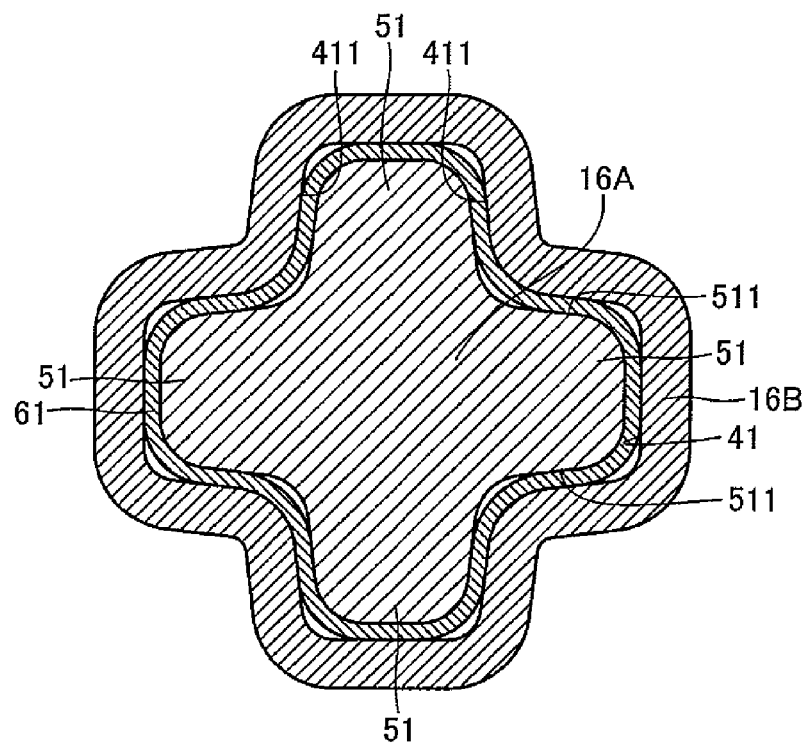
FIGS. 2A and 2B are enlarged cross-sectional views of section A-A in FIG. 1, where
Figure 2B:
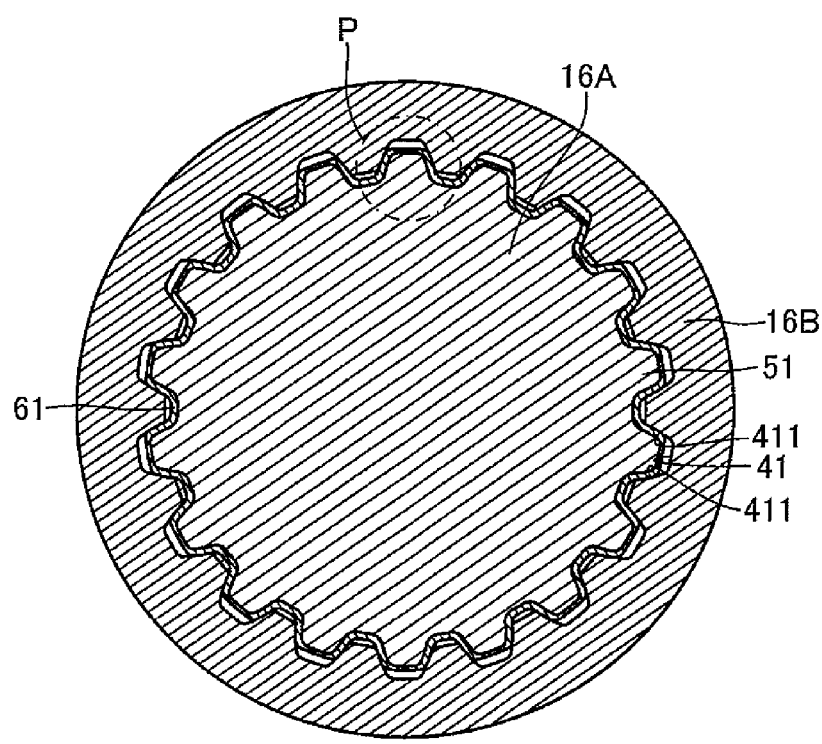

As illustrated in FIG. 1, FIG. 2A and FIG. 2B, the female shaft 16B is formed into a hollow cylindrical shape using carbon steel or an aluminum alloy. A plurality of grooves 41 in the axial direction are formed around the inner circumference of the female shaft 16B in a radial fashion from the center axis of the female shaft 16B, and are evenly spaced in the circumferential direction and extend over the entire length of the telescopic range (telescopic stroke).

The male shaft 16A as well is formed into a solid shape using carbon steel or an aluminum alloy. A plurality of teeth 51 are formed around the outer circumference of the male shaft 16A in a radial fashion from the center axis of the male shaft 16A, and are evenly spaced in the circumferential direction and extend over the entire length of the telescopic range (telescopic stroke).

FIG. 2A illustrates an example of using a resin sleeve on the teeth 51 of the male shaft 16A as a coated section 61 for reducing sliding resistance with the grooves 41 of the female shaft 16B. More specifically, in this example, non-circular construction for transmitting rotation torque is composed of a male shaft 16A having four teeth 51 in the axial direction and a female shaft 16B having four grooves 41 in the axial direction, and a resin sleeve is coated over the entire length in the axial direction of the teeth 51 of the male shaft 16A.

FIG. 2B illustrates an example of using a resin coating on the teeth 51 of the male shaft 16A as a coated section 61 for reducing sliding resistance with the grooves 41 of the female shaft 16B. More specifically, in this example, non-circular construction for transmitting rotation torque is composed of a male shaft 16A having eighteen teeth 51 in the axial direction and a female shaft 16B having eighteen grooves 41 in the axial direction, and a resin coating is performed over the entire length in the axial direction of the teeth 51 of the male shaft 16A.

As material for the coated section 61 there could be:

(1) rubber such as natural rubber, synthetic rubber, a mix of natural rubber and synthetic rubber, and the like;

(2) solid lubricant such as molybdenum disulfide, graphite, fluorine compound, and the like;

(3) rubber that includes a solid lubricant such as molybdenum disulfide, graphite, fluorine compound, and the like;

(4) polymer such as polytetrafluoroethylene, phenol resin, acetal resin, polyimide resin, polyamide-imide resin, polyether sulfone resin, polyphenylene sulfide, polyether ether ketone resin, polyamide resin, polyacetal (POM) resin and the like;

(5) polymer that includes a solid lubricant such as molybdenum disulfide, graphite, fluorine compound, and the like.

Figure 4A:
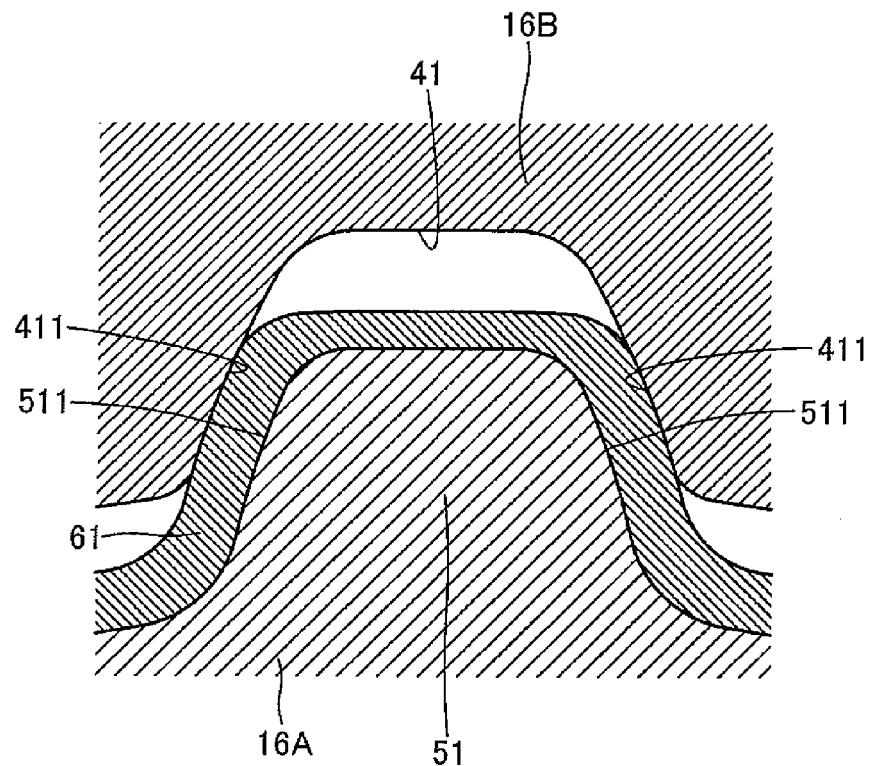
FIGS. 4A and 4B are enlarged cross-sectional views of part P in FIG. 2B, and illustrate a manufacturing process of a telescopic shaft of the first example of an embodiment of the present invention.

After a coated section 61 that reduces the sliding resistance with the grooves 41 of the female shaft 16B has been formed along the entire length in the axial direction of the teeth 51 of the male shaft 16A, as illustrated in FIG. 4A, the grooves 41 of the female shaft 16B are fitted over the entire length in the axial direction of the teeth 51 of the male shaft 16A, as illustrated in FIG. 1. The thickness of the coated section 61 is formed to a thickness such that the sliding resistance before the intermediate shaft has been broken in becomes at least a greater sliding resistance than the lower limit value of a specified allowable sliding resistance range, and is set so that there is interference between the side surfaces 411 of the grooves 41 and the coated section 61. The specified allowable sliding resistance range is arbitrarily set according to the type, size and use of the telescopic shaft. For example, when the specified sliding resistance after the shaft has been broken in is in the range from 5 N to 70 N, the specified allowable sliding resistance is set to at least 5 N or greater, and preferably 70 N or greater. The amount of interference is also arbitrarily set according to the type, size and use of the telescopic shaft. For example, in the case of an intermediate shaft of a steering apparatus for an automobile, the amount of interference can be set within the range from 0.005 mm to 0.1 mm, and preferably within the range from 0.01 mm to 0.03 mm.

Moreover, preferably a specified amount of grease having a specified hardness (NLGI consistency number: class 1 to class 3) is filled in between the grooves 41 of the female shaft 16B and the outer circumference of the coated section 61. The type of and amount of grease used is also arbitrarily set according to the type, size and use of the telescopic shaft. Preferably, an extreme-pressure grease that includes a solid lubricant such as molybdenum disulfide, graphite, fluorine compound, and the like is used.

Next, as illustrated in FIG. 1, with the outer circumference of the female shaft 16B fastened to a processing tool 71, a load P (lateral load in the direction of the white arrow) in a direction orthogonal to the center axis line 161A of the male shaft 16A is applied to the right end of the male shaft 16A. As a result, there is relative bending between the female shaft 16B and the male shaft 16A. Alternatively, the male shaft 16A can be fastened to a processing tool 71, and a load that is orthogonal to the center axis line 161B of the female shaft can be applied to the left end of the female shaft 16B. This load P is also arbitrarily set according to the type, size and use of the telescopic shaft. For example, in the case of an intermediate shaft of a steering apparatus for an automobile, this load P is set in the range from 5 N to 70 N, and preferably in the range from 10 N to 50 N.

With a load applied in a direction of relative bending of the male shaft 16A with respect to the female shaft 16B, the male shaft 16A is caused to move back-and-forth a specified number of times at a specified sliding speed in the axial direction with respect to the female shaft 16B, as indicated by the white arrows R in FIG. 1. In this example, the distance that the male shaft 16A is caused to move back-and-forth with respect to the female shaft 16B is set to be the same distance that the male shaft 16A will be caused to move back-and-forth with respect to the female shaft 16B when assembled in the vehicle.

The sliding speed of the back-and-forth sliding motion during manufacturing is arbitrarily set according to the type, size and use of the telescopic shaft. Preferably, the sliding speed at which the male shaft 16A is caused to slide back-and-forth with respect to the female shaft 16B is 100 mm/sec or greater, and preferably 800 mm/sec. As long as the sliding speed is 100 mm/sec or greater, heating of the coated section 61 is performed effectively, and it is possible to shorten the work time required for setting the sliding resistance to a specified value.

The number of times that back-and-forth sliding motion is performed during manufacturing is also arbitrarily set according to the type, size and use of the telescopic shaft. Preferably, the number of times back-and-forth sliding motion is performed per unit time when causing the male shaft 16A to slide back-and-forth with respect to the female shaft 16B is 20 times/sec or greater, and more preferably 40 times/sec or greater. As long as the number of times back-and-forth sliding motion is performed per unit times is 20 times/sec or greater, heating of the coated section 61 can be performed in a short time, and thus it is possible to shorten the manufacturing time for setting the sliding resistance to a specified value.

Furthermore, it is also possible to set the number of times back-and-forth sliding motion is performed per unit time to about 200 times/sec or more and preferably 400 times/sec or more, which causes the coated section 61 to melt, so that the coated section 61 can be plastically deformed with a small surface pressure on the sliding surface. In this case, it is possible to use a vibration generator for vibration welding. A vibration generator for vibration welding is an apparatus in which a vibrating body that is formed using a magnetic substance is placed between a pair of electromagnets, and that vibrating body is caused to vibrate back and forth between the pair of electromagnets by alternating the flow of excitation current to the pair of electromagnets at a specified cycle.

In this example, the range in which the male shaft 16A is caused to slide back-and-forth with respect to the female shaft 16B during manufacturing is set to be the same as the range in which the male shaft 16A is caused to slide back-and-forth with respect to the female shaft 16B when assembled in the vehicle. Alternatively, as illustrated in FIG. 6A, the range B1 in which the male shaft 16A is caused to slide back-and-forth with respect to the female shaft 16B during manufacturing can be set to be different than the range B2 in which the male shaft 16A is caused to slide back-and-forth with respect to the female shaft 16B when assembled in the vehicle.

When the male shaft 16A is caused to slide back-and-forth with respect to the female shaft 16B during manufacturing, the inner circumference of the female shaft 16B wears and the ability to hold grease drops, however, by setting the range for causing the male shaft 16A to slide back-and-forth with respect to the female shaft 16B when assembled in the vehicle different, it is possible to suppress the decrease in the capability to hold grease.

Moreover, alternatively, in regards to the distance over which the male shaft 16A is caused to slide back-and-forth with respect to the female shaft during manufacturing, the distance L1 over which the male shaft 16A is caused to slide back-and-forth with respect to the female shaft during manufacturing can also be set to be a different distance than the distance L2 over which the male shaft 16A is caused to slide back-and-forth with respect to the female shaft when assembled in the vehicle (1% to 70% shorter distance). By setting the distance over which the male shaft 16A is caused to slide back-and-forth with respect to the female shaft when assembled in the vehicle to different distance in this way, it is possible to suppress a drop in the ability to hold grease.

Figure 7A:
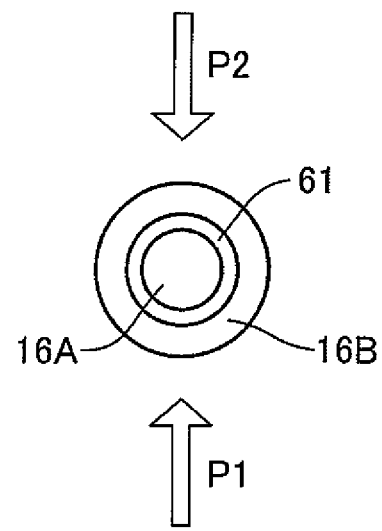
FIGS. 7A and 7B illustrate another alternative version of the first example of an embodiment of the present invention, and corresponds to the direction of arrow Q in FIG. 1, where
Figure 7B:
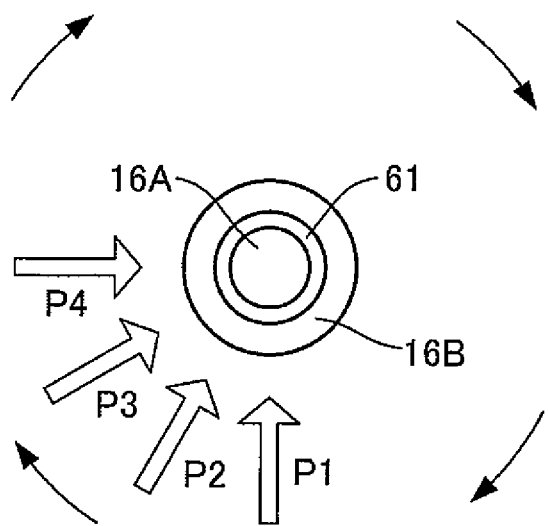

In this example, the load in a direction causing the male shaft 16A to bend relative to the female shaft 16B is applied from one angular position in the circumferential direction of the male shaft 16A, however, is not limited to this. In other words, as illustrated in FIG. 7A, preferably, it is also possible to alternately apply loads P1, P2 from a plurality of angular positions in the circumferential direction of the male shaft 16A. Moreover, the number of times that the load is applied is not limited to one time, and it is possible to a load a plurality of times from one angular position. Furthermore, as illustrated by the white arrows P1, P2, P3 and P4 in FIG. 7B, it is also possible to continuously cause the direction of the load to change in the circumferential direction of the male shaft 16A.

Figure 3:
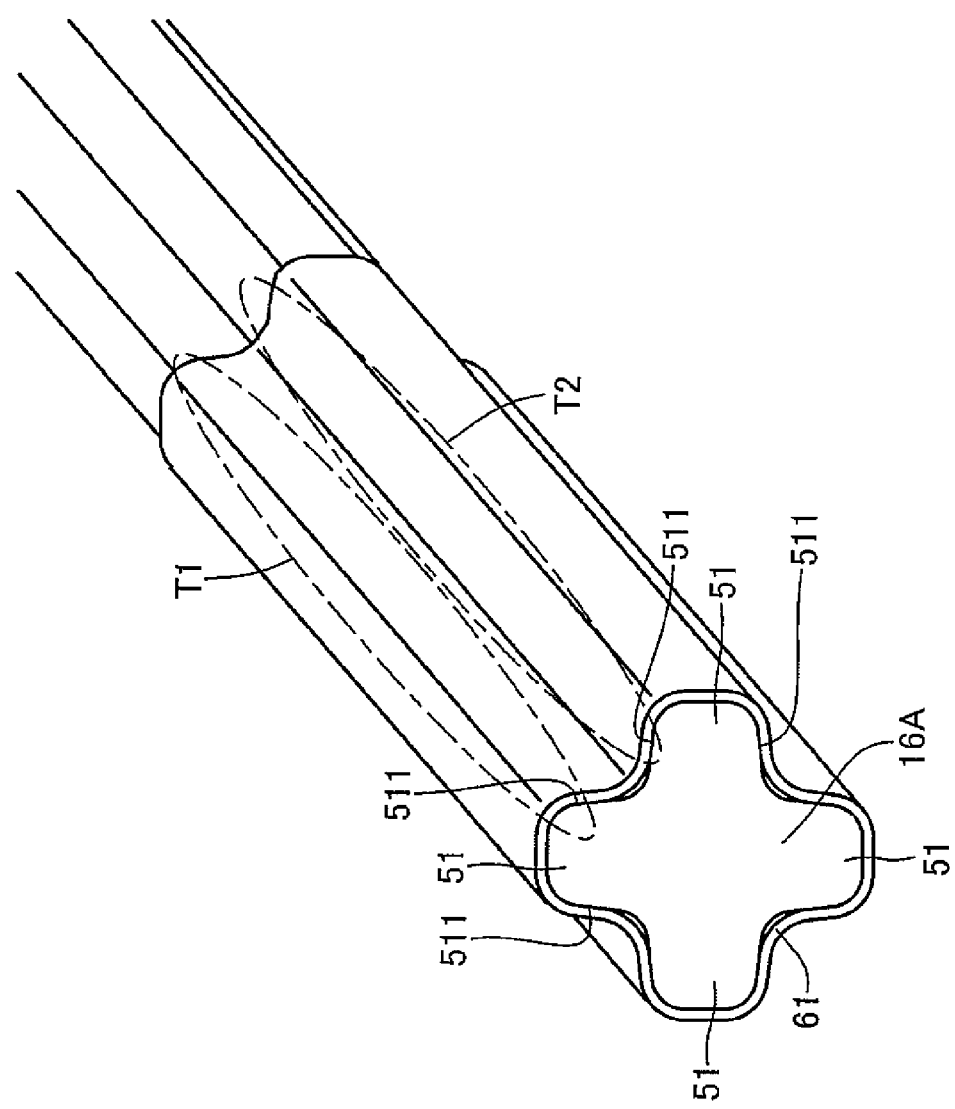
FIG. 3 is a perspective view illustrating a male shaft of a telescopic shaft of the first example of an embodiment of the present invention.
Figure 4B:
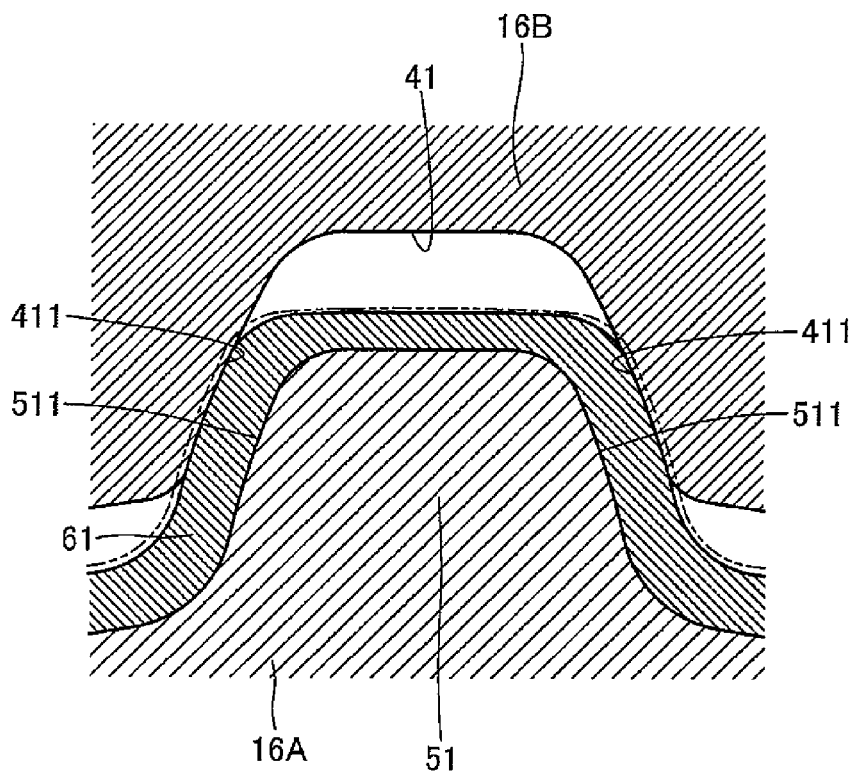
Figure 5A:
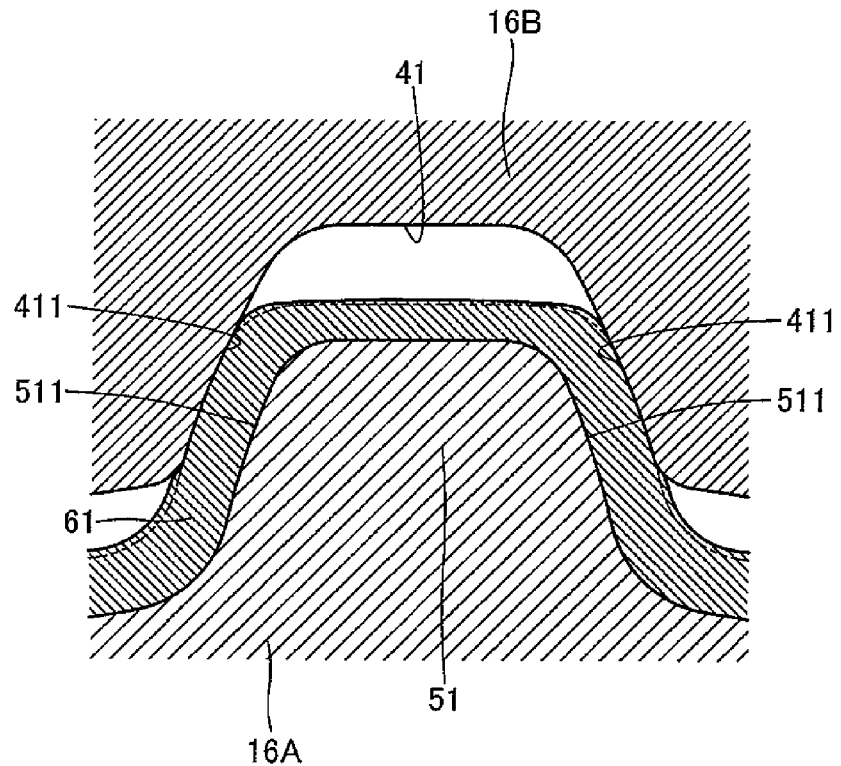
FIGS. 5A and 5B are enlarged cross-sectional views of part P in FIG. 2B, and illustrate the post processing in FIGS. 4A and 4B.

When the male shaft 16A is caused to slide back-and-forth with respect to the female shaft 16B, the coated section 61 is heated by friction heat generated between the grooves 41 and the side surfaces 411. When the coated section 61 becomes heated, the coated section 61 expands along the entire length in the axial direction of the teeth 51 of the male shaft 16A as illustrated by the dash-double-dot line in FIG. 4B. Therefore, as illustrated by the dot-dashed elliptical lines T1 and T2 in FIG. 3, and as illustrated in FIG. 5A, the interference between the side surfaces of the grooves 41 and the side surfaces 511 of the teeth 51 becomes large, which causes plastic deformation and compressive strain to occur in the coated section 61.

In this example, when the male shaft 16A is caused to slide back-and-forth with respect to the female shaft 16B, there is hard grease filled between the side surfaces 411 of the grooves 41 and the coated section 61, so the friction heat that is generated between the side surfaces 411 of the grooves 41 and the coated section 61 increases, and thus the coated section 61 is heated in a short period of time.

By causing the male shaft 16A to slide back-and-forth with respect to the female shaft 16B, the teeth 51 of the male shaft 16A and the grooves 41 of the female shaft 16B are uniformly in contact with each other along the entire length in the axial direction, and the sliding resistance becomes constant along the entire length of the slide range (slide stroke). Moreover, when the temperature of the coated section 61 is high, the coated section 61 receives a large compressive stress, so over time, compressive strain of the coated section 61 due to the creep phenomenon increases.

Figure 5B:
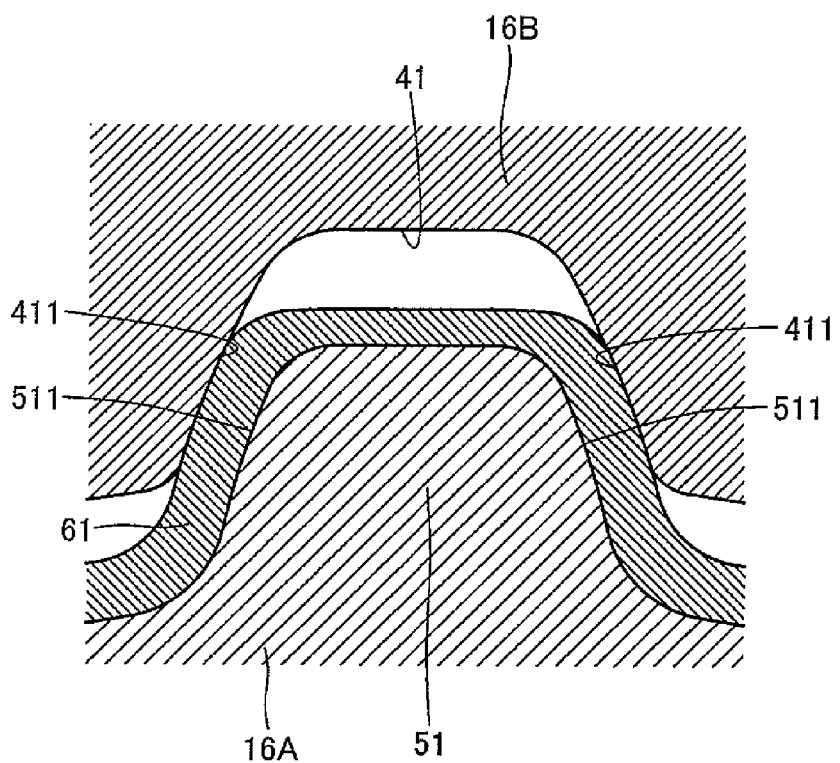

After sliding back-and-forth of the male shaft 16A with respect to the female shaft 16B is complete, the intermediate shaft 16 dissipates heat, and the coated section 61 returns to normal temperature, then as illustrated in FIG. 5B, the coated section 61 contracts. As a result, the interference of coated section 61 between the side surfaces 411 of the grooves 41 and the side surfaces 511 of the teeth 51 decreases, and the sliding resistance of the intermediate shaft after being broken in becomes a specified value.

When the male shaft 16A is caused to slide back-and-forth with respect to the female shaft 16B while a load is being applied in a direction that bends the male shaft 16A relative to the female shaft 16B, the coated section 61 receives a large compressive stress, and the compressive strain of the coated section 61 increases, so it is possible to reduced the work time required for making the sliding resistance a specified value. It is also possible to cause the male shaft 16A to slide back-and-forth with respect to the female shaft 16B without applying a load in a direction that bends the male shaft 16A relative to the female shaft 16B.

The surface roughness of the inner circumferential surface of the female shaft 16B during manufacturing can be set to 5% to 20% greater than the surface roughness of the inner circumferential surface of the female shaft when assembled in the vehicle and used as a product. By setting the surface roughness of the inner circumferential surface of the female shaft 16B during manufacturing to be greater, the friction resistance between the side surfaces 411 of the grooves 41 and the coated surface 61 increases, and greater friction heat is generated. Therefore, it is possible to heat the coated section 61 in a shorter time, and thus it is possible to shorten the work time required for making the sliding resistance a specified value.

Moreover, during manufacturing, after the male shaft 16A has been caused to slide back-and-forth with respect to the female shaft 16B, the coated section 61 has been cause to plastically deform and the sliding resistance has become a specified value, it is possible to additionally fill grease between the coated section 61 and the inner circumferential surface of the female shaft 16B, or it is possible to replace grease that has been filled between the coated section 61 and the inner circumferential surface of the female shaft 16B. During manufacturing, there is a possibility that as the inner circumferential surface of the female shaft 16B wear, metal powder will mix with the grease, however, by adding grease or replacing the grease, it is possible to suppress the mixture ratio of metal powder.

It also possible to cause the male shaft 16A to slide back-and-forth in the axial direction with respect to the female shaft 16B as a slow sliding speed, small sliding surface pressure and small sliding distance, after which the sliding speed, sliding surface pressure, and sliding distance are changed and the male shaft 16A to slide back-and-forth in the axial direction with respect to the female shaft 16B again, continuing this work until the sliding resistance becomes a specified value. In other words, it is possible to cause male shaft 16A to slide back-and-forth with respect to the female shaft 16B under a plurality of sliding conditions.

Moreover, the sliding speed, the sliding surface pressure and the sliding distance can be changed according to the value of the sliding resistance when the male shaft 16A is caused to slide back-and-forth in the axial direction with respect to the female shaft 16B a specified number of times. In other words, in order to obtain test data for before manufacturing, the value of the sliding resistance when the male shaft 16A is caused to slide back-and-forth with respect to the female shaft 16B a specified number of times (for example, a specified number of times selected from one to ten times) is measured.

In order to make the measured sliding resistance a specified value, the relationship between the number of times that sliding motion is performed and the amount that the sliding resistance drops when the male shaft 16A is caused to slide back-and-forth in the axial direction with respect to the female shaft 16B is tested before hand and data is obtained. Preferably, the data speed and sliding surface pressure during back-and-forth sliding motion is changed and tested, to obtain data for a suitable sliding speed and sliding surface pressure.

During manufacturing, the value of the sliding resistance when the male shaft 16A is caused to slide back-and-forth with respect to the female shaft 16B a specified number of times is measured again, and according to this measurement value, by causing the male shaft 16A to slide back-and-forth with respect to the female shaft 16B at the sliding speed, sliding surface pressure and sliding distance that were set from the data acquired in advance, it is possible to keep the sliding resistance after being broken in within a specified allowable range.

Alternatively, in order to obtain test data before manufacturing, two values, the value of the sliding resistance and the value of the temperature of the coated section, are measured when the male shaft 16A is caused to slide back-and-forth with respect to the female shaft 16B a specified number of times (for example, a specified number of times selected from among one to ten times). In order to set the sliding resistance when the temperature was measured to a specified value, the relationship between the number of times that sliding is performed and the amount of drop in the sliding resistance when the male shaft 16A has slid back-and-forth in the axial direction with respect to the female shaft 16B a specified number of times is found beforehand by testing, and data is obtained. Preferably, testing is performed by changing the sliding speed and sliding surface pressure during back-and-forth motion, and data for a suitable sliding speed and sliding surface pressure is obtained.

During manufacturing, the value of the sliding resistance when the male shaft 16A is caused to slide back-and-forth with respect to the female shaft 16B a specified number of times is measured again, and according to this measurement value, by causing the male shaft 16A to slide back-and-forth with respect to the female shaft 16B at the sliding speed, sliding surface pressure and sliding distance that were set from the data acquired in advance, it is possible to keep the sliding resistance after being broken in within a specified allowable range.

Moreover, in this example, a coated section 61 for reducing sliding resistance was formed on teeth 51 side of the male shaft 16A, however, it is also possible to form a coated surface 61 for reducing sliding resistance on the groove 41 side of the female shaft 16B. Moreover, it is also possible to form a coated surface 61 for reducing sliding resistance on both the teeth 51 side of the male shaft 16A and the groove 41 side of the female shaft 16B. Furthermore, it is also possible to form the male shaft 16A or the female shaft 16B using the same material as the coated section 61 for reducing sliding resistance.

In the telescopic shaft that is obtained using the manufacturing method of this example and after being broken in, the sliding resistance is constant over the entire length of the sliding range, and fluctuation in the sliding resistance due to sliding position is very small. More specifically, the fluctuation in the sliding resistance in the axial direction according to the sliding position is within the range 0% to 20%.

EXAMPLE 2

A second example of an embodiment of the present invention is a variation of the first example, wherein this second example is characterized in that instead of applying a load in a direction bending the male shaft 16A with relative to the female shaft 16B, with just a specified amount of harder grease (NLGI consistency number: class 1 to class 3) filled in between the coated section 61 and the inner circumferential surface of the female shaft 16B, the male shaft 16A is caused to slide back-and-forth with respect to the female shaft 16B only a specified number of times.

In this example, because grease that is harder than in Example 1 is filled, when the male shaft 16A is caused to slide back-and-forth with respect to the female shaft 16B, so friction heat that is generated between the side surfaces 411 of the grooves 41 and the coated section 61 increases, and thus the coated section is heated in a shorter time. Therefore, it is possible to greatly reduce the work time required to make the sliding resistance of the intermediate shaft 16 a specified value. Fluctuation of the sliding resistance in the axial direction according to the sliding position of the telescopic shaft that is obtained using the manufacturing method of this example after being broken in is within the range from 0% to 70%. The construction and functions of the other parts of this second example are the same as in the first example.

EXAMPLE 3

Figure 8:
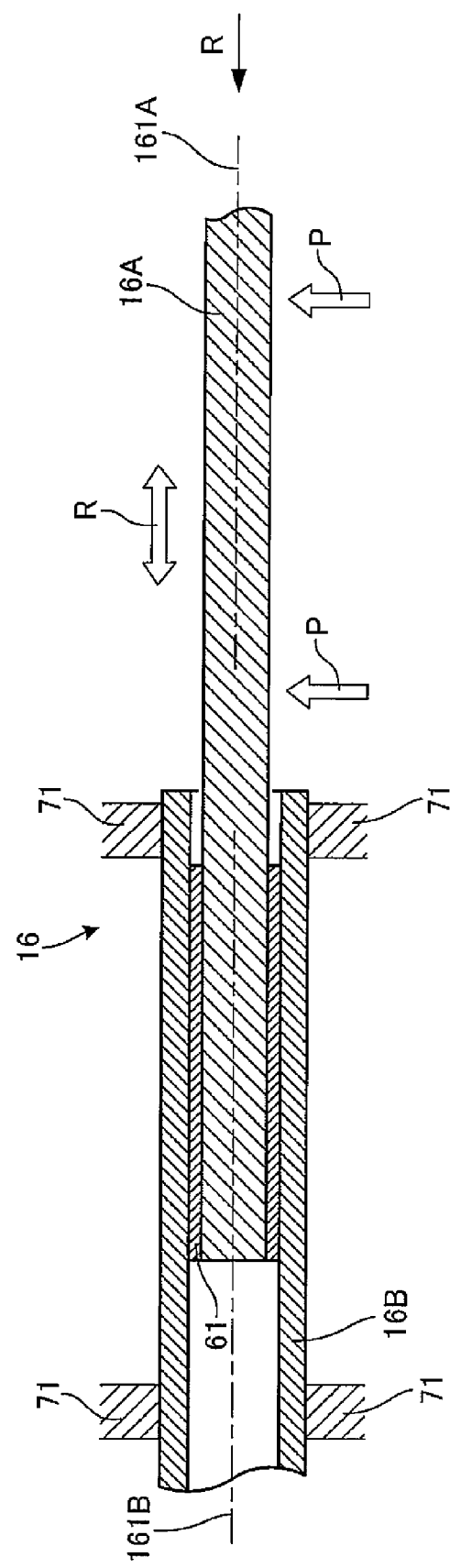
FIG. 8 is a vertical cross-sectional view illustrating a manufacturing process of a telescopic shaft of a third example of an embodiment of the present invention.

FIG. 8 and FIG. 9 illustrate the manufacturing process of a telescopic shaft of a third example of an embodiment of the present invention. This example as well, is a variation of the first example of an embodiment, and is characterized in that the male shaft 16A is caused to slide back-and-forth in the axial direction relative to the female shaft 16B while applying a load in a direction that causes the center axis line of the male shaft 16A to shift with respect to the center axis line of the female shaft 16B to the male shaft 16A.

In other words, as illustrated in FIG. 8, with the outer circumferential surface of the female shaft 16B fastened to a processing tool 71, a load P (lateral load indicated by the white arrows) is applied to the male shaft 16A in a direction the causes the center axis line 161A of the male shaft 16A to shift with respect to the center axis line 161B of the female shaft 16B. Alternatively, it is possible to fasten the male shaft 16A to the processing tool and applied a load to the female shaft 16B in a direction that causes the center axis line 161B of the female shaft 16B to shift with respect to the center axis line 161A of the male shaft 16A. This load P is set arbitrarily according to the type, size and use of the telescopic shaft. For example, in the case of an intermediate shaft of a steering apparatus for an automobile, the load P is set to from 5 N to 70 N.

Figure 9A:
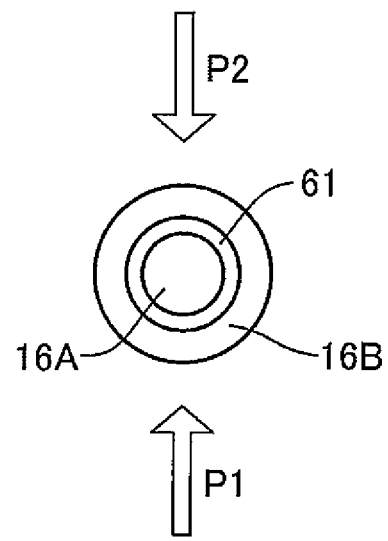
FIGS. 9A and 9B are views in the direction of arrow R in FIG. 8, where
Figure 9B:
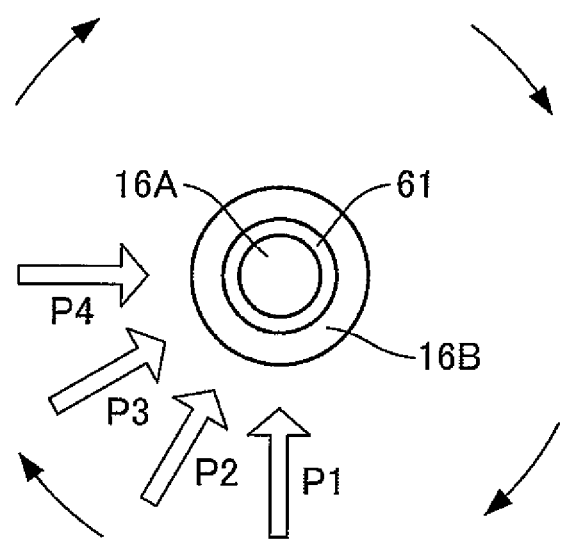

The load in a direction that causes the center axis line 161A of the male shaft 16A to shift with respect to the center axis line 161B of the female shaft 16B is not limited to the example of applying the load from one angular position in the circumferential direction of the male shaft 16A. In other words, preferably, as illustrated in FIG. 9A, it is possible to alternately apply loads P1 and P2 from a plurality of angular position in the circumferential direction of the male shaft 16A. The number of times that the load is applied is not limited to one time, and it is possible to apply the load a plurality of time from one angular position. Moreover, as illustrated by the white arrows P1, P2, P3 and P4 in FIG. 9B, it is also possible to continuously change the direction of the load in the circumferential direction of the male shaft 16A.

In this example, the male shaft 16A is caused to slide back-and-forth with respect to the female shaft 16B while applying a load in a direction that causes the center axis line 161A of the male shaft 16A to shift with respect to the center axis line 161B of the female shaft 16B, so the coated section 61 receives a large compressive stress, that the compressive strain of the coated section 61 increases, so it is possible to shorten the work time for making the sliding resistance a specified value. Fluctuation of the sliding resistance in the axial direction according to the sliding position of the telescopic shaft that is obtained using the manufacturing method of this example after being broken in is within the range from 0% to 20%. The construction and functions of the other parts of this third example are the same as in the first example.

EXAMPLE 4

Figure 10:
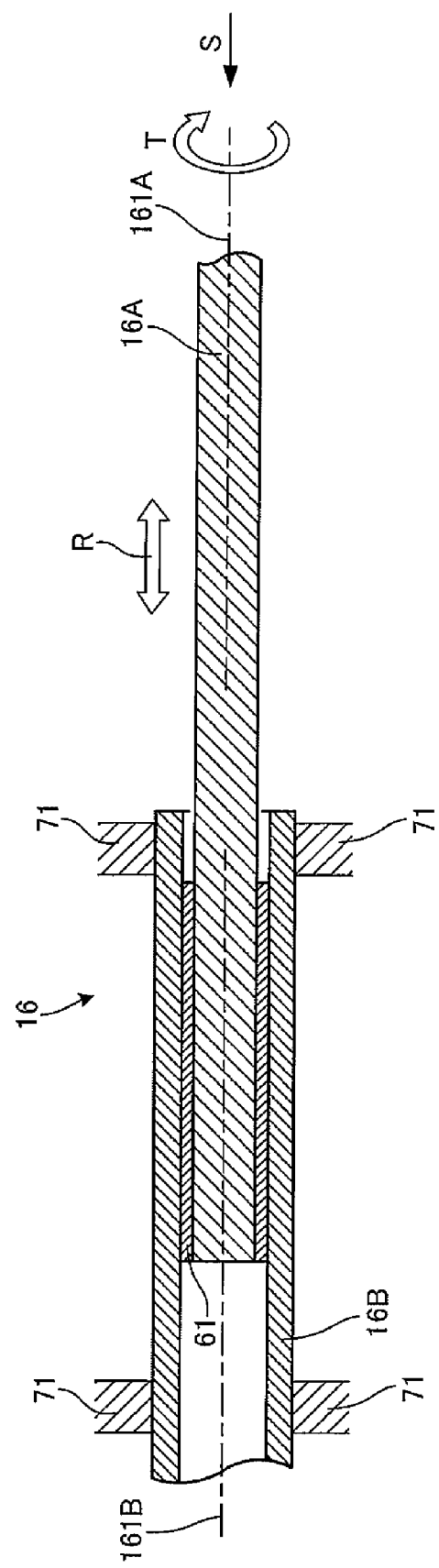
FIG. 10 is a vertical cross-sectional view that illustrates a manufacturing process of a telescopic shaft of a fourth example of an embodiment of the present invention.

FIG. 10 and FIG. 11 illustrate a manufacturing process for a telescopic shaft of a fourth example of an embodiment of the present invention. This example as well is a variation of example 1 of the embodiment, and is characterized in that the male shaft 16A is caused to slide back-and-forth with respect to the female shaft 16B while applying a rotation torque between the male shaft 16A and the female shaft 16B.

In other words, in this example, as illustrated in FIG. 10, with the outer circumference of the female shaft 16B fastened to a processing tool 71, a rotation torque T is applied to the male shaft 16A. Alternatively, the male shaft 16A can be fastened to a processing tool, and a rotation torque T can be applied to the female shaft 16B. The rotation torque T is arbitrarily set according to the type, size and use of the telescopic shaft. For example, in the case of an intermediate shaft of a steering apparatus for an automobile, this torque can be set to from 1 N·m to 300 N·m.

Figure 11A:
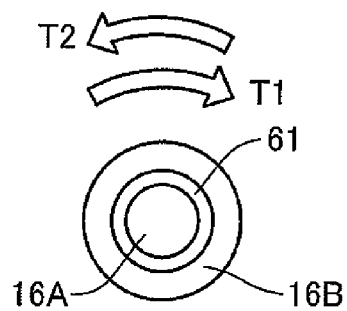
FIGS. 11A and 11B is a view in the direction of arrow S in FIG. 10, where
Figure 11B:
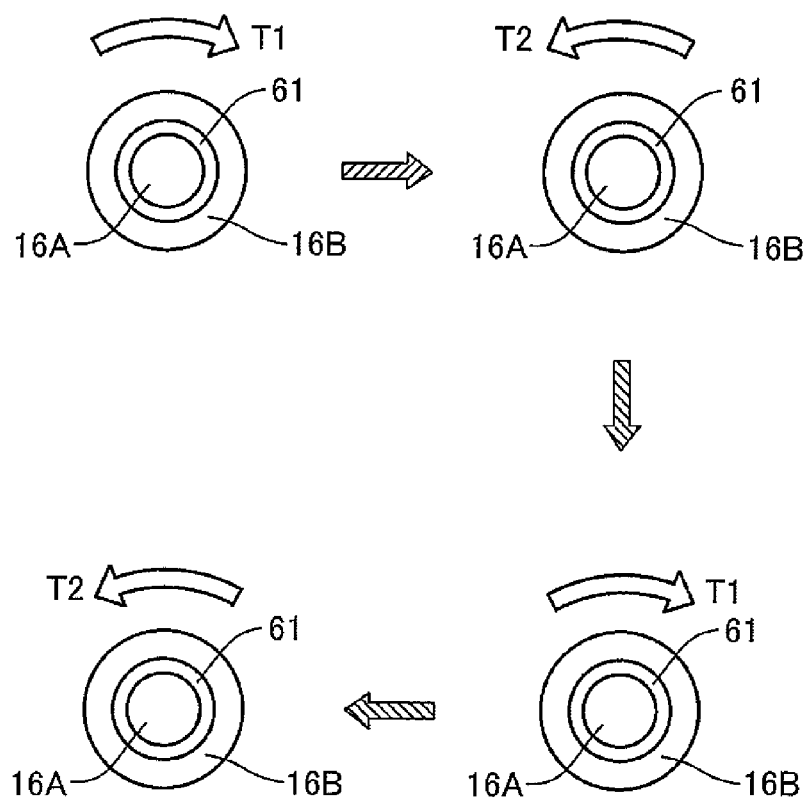

The rotation torque that is applied between the female shaft 16B and the male shaft 16A is not limited to one direction, clockwise or counterclockwise. In other words, as illustrated in FIG. 11A, after a rotation torque T1 has been applied in the clockwise direction, it is possible to apply a rotation torque T2 in the counterclockwise direction, and alternate this repeatedly over a short period of time as illustrated in FIG. 11B.

In this example, when the main shaft 16A is caused to slide back-and-forth with respect to the female shaft 16B while applying a rotation torque between the female shaft 16B and the male shaft 16A, the coated section 61 receives a large compressive stress and the compressive strain of the coated section 61 increases, so it is possible to shorten the work time for making the sliding friction a specified value. Fluctuation of the sliding resistance in the axial direction according to the sliding position of the telescopic shaft that is obtained using the manufacturing method of this example after being broken in is within the range from 0% to 20%. The construction and functions of the other parts of this fourth example are the same as in the first example.

EXAMPLE 5

Figure 12:
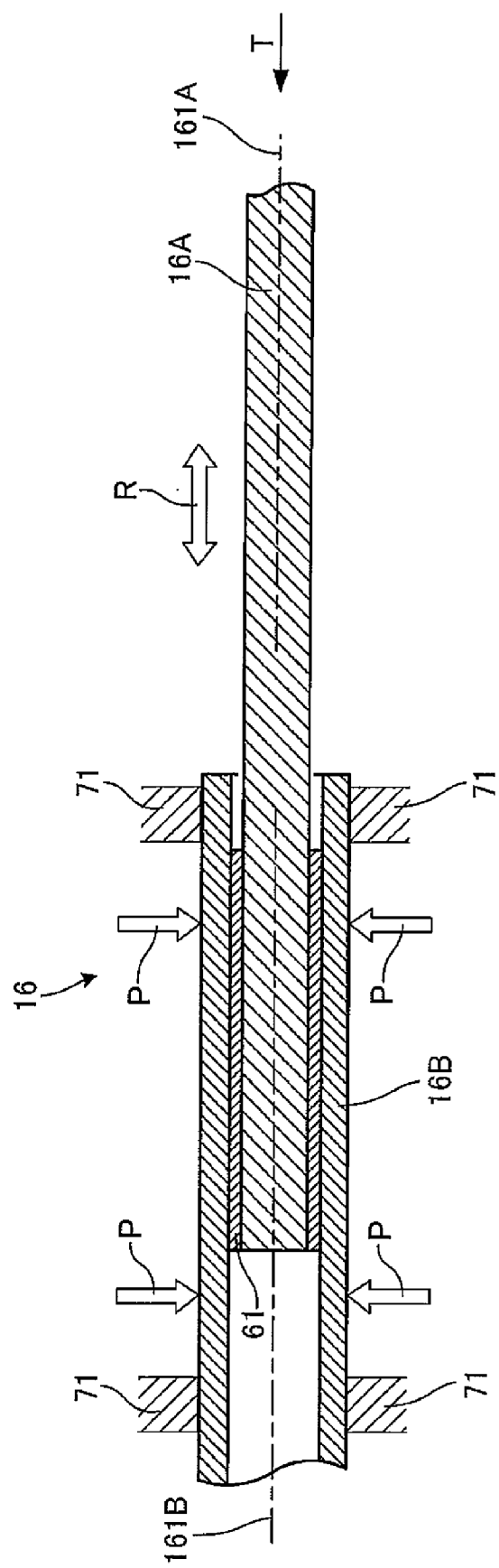
FIG. 12 is a vertical cross-sectional view illustrating a manufacturing process of a telescopic shaft of a fifth example of an embodiment of the present invention.
Figure 13:
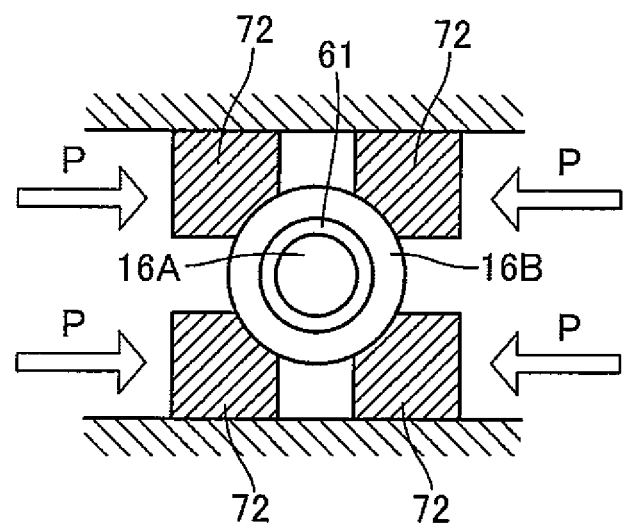
FIG. 13 is a view in the direction of arrow T in FIG. 12.

FIG. 12 and FIG. 13 illustrate a manufacturing process of a telescopic shaft of a fifth example of an embodiment of the present invention. The example is also a variation of the first example of the embodiment and is characterized in that the male shaft 16A is caused to slide back-and-forth with respect to the female shaft 16B while applying a load in a direction that reduces the diameter of the inner circumference of the female shaft 16B.

In other words, in this example, as illustrated in FIG. 12, with the outer circumference of the female shaft 16B fastened to the processing tool 71, a load P is applied that reduces the diameter of the inner circumference of the female shaft 16B. As illustrated in FIG. 13, a press 72 presses against four locations on the outer circumference of the female shaft 16B, and evenly reduces the diameter of the inner circumference of the female shaft 16B. The range that the diameter of the inner circumference of the female shaft 16B is reduced is preferably a range that includes the entire range over which the male shaft 16A is caused to slide back-and-forth with respect to the female shaft 16B when assembled in the vehicle, however, it could also be part of the range over which the male shaft 16A is caused to slide back-and-forth with respect to the female shaft 16B when assembled in the vehicle. This load P is also arbitrarily set according to the type, size and use of the telescopic shaft. For example, in the case of an intermediate shaft of a steering apparatus for an automobile, this load can be set to 5 N to 70N.

The male shaft 16A is caused to slide back-and-forth in the axial direction with respect to the female shaft 16B a specified number of times while applying a load in a direction that reduces the diameter of the inner circumference of the female shaft 16B. As just described, because the male shaft 16A is cased to slide back-and-forth with respect to the female shaft 16B while applying a load in a direction that reduces the diameter of the inner circumference of the female shaft 16B, in this example as well, the coated section 61 receives a large compressive stress and the compressive strain of the coated section 61 increases, and thus it is possible to shorten the work time for making the sliding friction a specified value. Fluctuation of the sliding resistance in the axial direction according to the sliding position of the telescopic shaft that is obtained using the manufacturing method of this example after being broken in is within the range from 0% to 70%. The construction and functions of the other parts of this fifth example are the same as in the first example.

EXAMPLE 6

Figure 14:
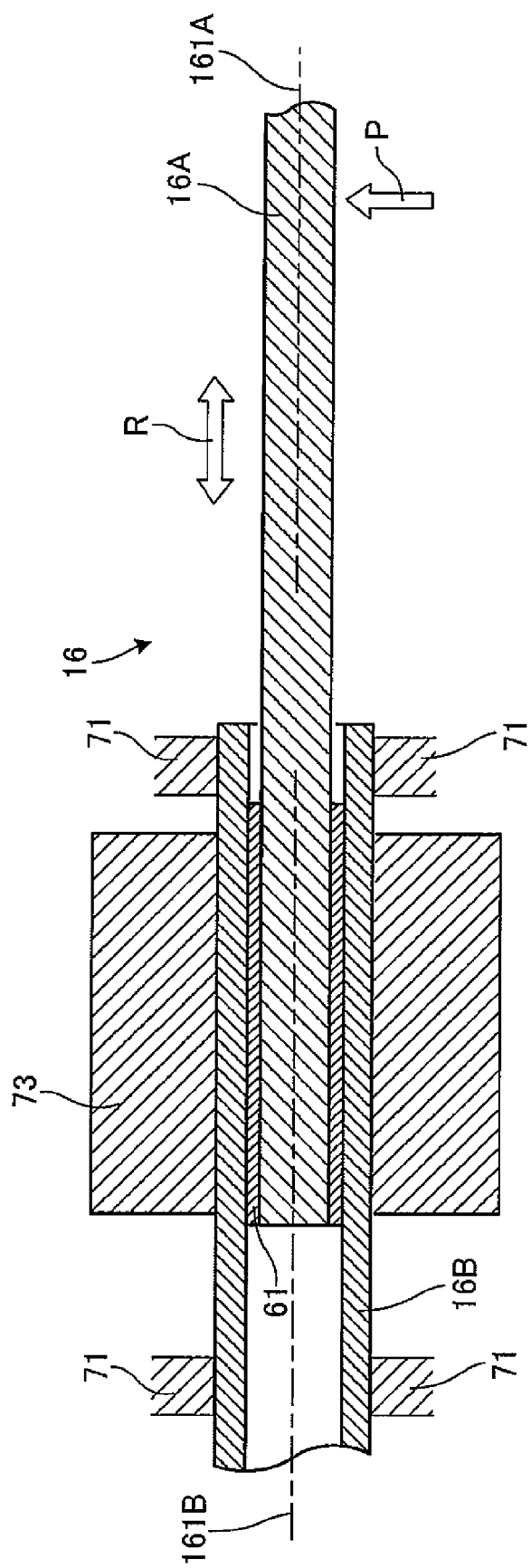
FIG. 14 is a vertical cross-sectional view illustrating a manufacturing process of a telescopic shaft of sixth example of an embodiment of the present invention.
Figure 15:
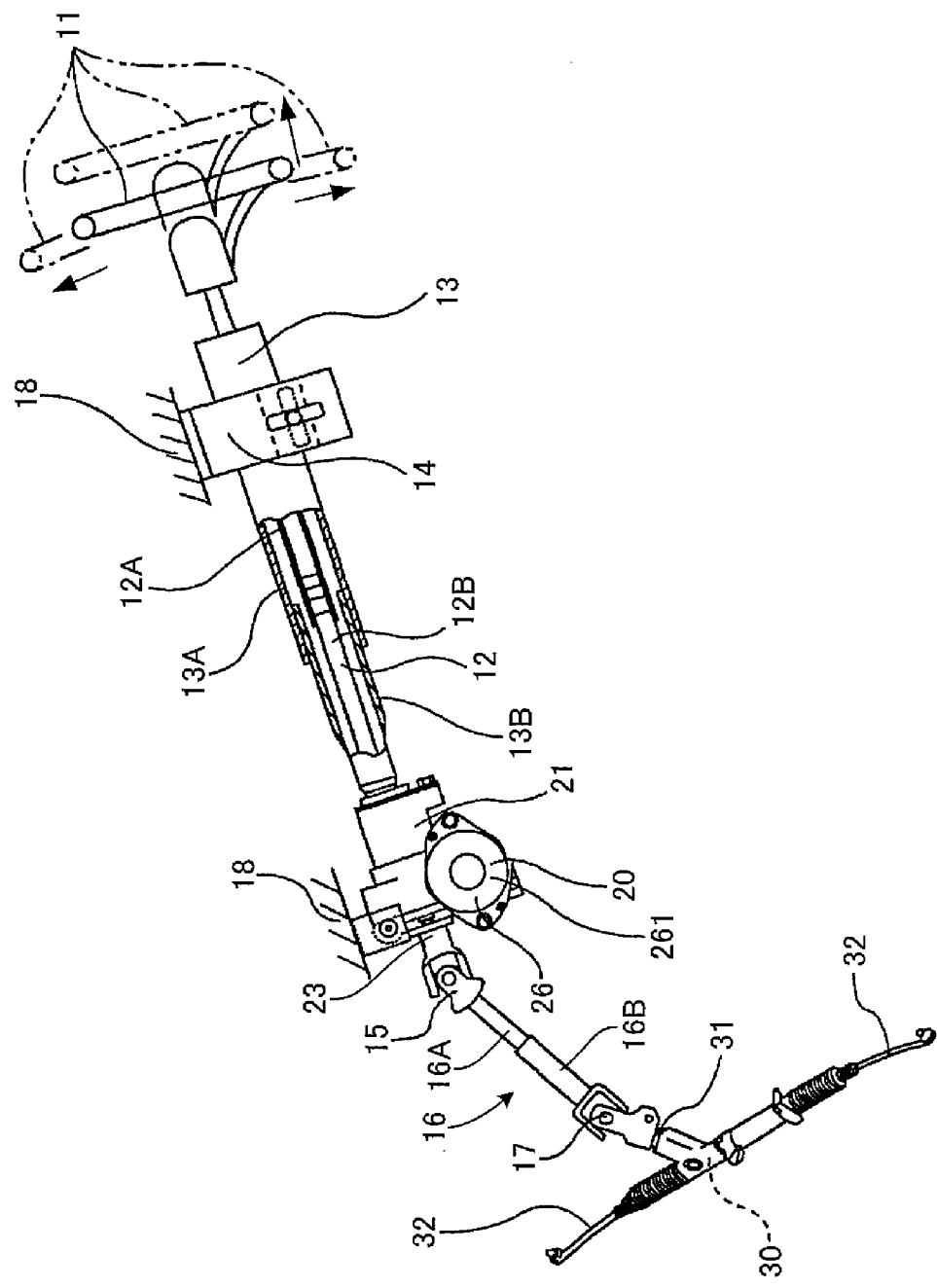
FIG. 15 is a partial cross-sectional view illustrating an entire conventional steering apparatus to which the present invention can be applied.

FIG. 14 illustrates a manufacturing process for a telescopic shaft of a sixth example of an embodiment of the present invention. This example as well is a variation of the first example, and is an example wherein the male shaft 16A is caused to slide back-and-forth in the axial direction with respect to the female shaft 16B while heating the coated section 61 with a heating apparatus 73, so even when there are convex sections on some localized parts of the inner circumference of the female shaft 16B, a localized increase in the sliding resistance due to the convex sections is suppressed.

In other words, in this example, as illustrated in FIG. 14, as in the first example, after the outer circumference of the female shaft 16B has been fastened to a processing tool 71, a heating apparatus 73 such as a high-frequency coil is fastened around the outer circumference of the female shaft 16B. When an alternating current is allowed to flow through the heating apparatus 73, the female shaft 16B is heated by electromagnetic induction, after which that heat is transmitted to the coated section 61 and the coated section 61 is heated to a specified temperature (40° C. to 250° C.). As a result, the coated section 61 expands along the entire length in the axial direction of the teeth 51 of the male shaft 16A. Alternatively, the coated section 61 could be heated from the male shaft 16A side.

Next, with the outer circumference of the female shaft 16B fastened to the processing tool 71, the male shaft 16A is caused to slide back-and-forth just a specified number of times in the axial direction with respect to the female shaft as indicated by the white arrow R, while applying a load (lateral load indicated by the white arrow) P in a direction orthogonal to the center axis line 161A of the male shaft 16A to the right end of the male shaft 16A. As the male shaft 16A is caused to slide back-and-forth with respect to the female shaft 16B, the coated section 61 is further heated by friction heat that is generated between the side surfaces 411 of the grooves 41 and the coated section 61. The direction in which the load is applied in this example is not limited to that in the example in the figure, and any direction illustrated in the examples 1 to 5 of the embodiment could be employed.

As the coated section 61 is heated, the coated section 61 further expands, and in this coated section 61, the interference between the side surfaces 411 of the grooves 41 and the side surfaces 511 of the teeth 51 increases, which causes plastic deformation and compressive strain. By causing the male shaft 16A to slide back-and-forth with respect to the female shaft 16B, the grooves 41 of the female shaft 16B and the teeth 51 of the male shaft 16A are in contact with each other uniformly along the entire length in the axial direction, and the sliding resistance is constant over the entire length of the sliding range (sliding stroke).

After that, when the alternating current is cut, heating by the heating apparatus is stopped, and sliding back-and-forth of the male shaft 16A with respect to the female shaft 16B is completed, the intermediate shaft dissipates heat and the coated section 61 returns to normal temperature and that coated section 61 contracts. As a result, in this coated section, the interference between the side surfaces 411 of the grooves 41 and the side surfaces 511 of the teeth 51 becomes smaller, and the sliding resistance of the intermediate shaft 16 after being broken in becomes a specified value.

By causing the coated section 61 to slide back-and-forth while heating this coated section 61 with a heating apparatus 73, the coated section 61 becomes even softer than in the first through fifth example of the embodiment where the coated section 61 is slide back-and-forth in a non-heated state. Therefore, even when there are convex sections on some localized parts of the inner circumference of the inside surfaces 411 of the grooves of the female shaft 16B, it is possible to suppress large compressive strain where the coated section comes in contact with the convex sections, and it is possible to suppress a localized increase in the sliding resistance.

Moreover, when the male shaft 16A is caused to slide back-and-forth with respect to the female shaft 16B while heating the coated section 61 with a heating apparatus, the coated section 61 can be heated in a short time, so it is possible to shorten the work time for making the sliding resistance a specified value. Heating by the heating apparatus can be performed the entire time that back-and-forth motion is performed, or alternatively, heating can be performed for a specified amount of time or until the coated section 61 reaches a specified temperature.

Furthermore, it is also possible after the sliding friction has been set to a specified value by causing the male shaft 16A to slide back-and-forth with respect to the female shaft 16B without filling between the coated section 61 and the inner circumference of the female shaft 16B with grease, and causing the coated section 61 to plastically deform, to fill between the coated section 61 and the inner circumference of the female shaft 16B with grease. When grease is not filled between the coated section 61 and the inner circumference of the female shaft 16B with grease during manufacturing, the friction resistance between the side surfaces 411 of the grooves 41 and the coated section 61 further increases, and more friction heat is generated. Therefore, it is possible to heat the coated section 61 in a short period of time, and thus it is possible to reduce the work time for making the sliding resistance a specified value. Fluctuation of the sliding resistance in the axial direction according to the sliding position of the telescopic shaft that is obtained using the manufacturing method of this example after being broken in is within the range from 0% to 20%. The construction and functions of the other parts of this sixth example are the same as in the first example.

INDUSTRIAL APPLICABILITY

The present invention can be suitably applied to an intermediate shaft of a steering apparatus of an automobile, however, is not limited to this, and the present invention could also be applied to an arbitrary telescopic shaft of a steering apparatus such as a steering shaft 12 or the like.

EXPLANATION OF REFERENCE NUMBERS

11 Steering wheel
12 Steering shaft
12A Outer shaft
12B Inner shaft
13 Steering column
13A Outer column
13B Inner column
14 Support bracket
15 Universal joint
16 Intermediate shaft
16A Male shaft
161A Center axis line
16B Female shaft
161B Center axis line
17 Universal joint
18 Vehicle 20 Assist apparatus
21 Gear housing
23 Output shaft
26 Electric motor
261 Case
30 Steering gear
31 Pinion shaft
32 Tie rod
41 Groove in the axial direction
411 Side surface
51 Teeth
511 Side surface
61 Coated section
71 Processing tool
72 Press
73 Heating apparatus

What is claimed is:

1. A method of manufacturing a telescopic shaft, the telescopic shaft comprising
a male shaft having a non-circular outer circumferential shape;
a female shaft
having a non-circular inner circumferential shape,
fitting around the male shaft,
being slideable in an axial direction relative to the male shaft, and
transmitting rotational torque to the male shaft; and
a coated section formed on a non-circular outer circumferential surface of the male shaft or formed on a non-circular inner circumferential surface of the female shaft, the coated section reducing an operational sliding resistance between the male shaft and the female shaft;
the method comprising:
(a) forming the coated section on the non-circular outer circumferential surface of the male shaft or the non-circular inner circumferential surface of the female shaft, the coated section
having a thickness that has the operational sliding resistance that is at least greater than a lower limit value of an allowable range for a specified sliding resistance, and
generating an interference when the female shaft is fitted onto the male shaft;
(b) fitting the female shaft onto the male shaft after the coated section has been formed such that the male shaft and the female shaft have the interference;
(c) filling grease between the coated section and the non-circular inner circumferential surface of the female shaft or the non-circular outer circumferential surface of the male shaft, the grease having a hardness in a range of NLGI consistency number of class 1 to class 3; and
(d) sliding the male shaft back-and-forth in the axial direction with respect to the female shaft after the grease has been filled, causing the coated section to be heated and expanded by friction heat that is generated due to the interference, and causing the coated section to plastically deform to reduce the interference and set the operational sliding resistance between the male shaft and the female shaft within the allowable range for the specified sliding resistance.

2. The manufacturing method for a telescopic shaft according to claim 1, wherein during the sliding, the male shaft is caused to relatively slide back-and-forth in the axial direction with respect to the female shaft, while applying a load in a direction that relatively bends the male shaft with respect to the female shaft.

3. The manufacturing method for a telescopic shaft according to claim 1, wherein during the sliding the male shaft is caused to relatively slide back-and-forth in the axial direction with respect to the female shaft, while a load in a direction that causes a center axis line of the male shaft to shift with respect to a center axis line of the female shaft is applied to the male shaft.

4. The manufacturing method for a telescopic shaft according to claim 1, wherein during the sliding, the male shaft is caused to relatively slide back-and-forth in the axial direction with respect to the female shaft, while a rotation torque is applied between the female shaft and the male shaft.

5. The manufacturing method for a telescopic shaft according to claim 1, wherein during the sliding, the male shaft is caused to relatively slide back-and-forth in the axial direction with respect to the female shaft, while a load in a direction reducing a diameter of an inner circumference of the female shaft is applied to the female shaft.

6. The method of manufacturing a telescopic shaft according to claim 1, further comprising
melting the coated section by friction heat generated by sliding the male shaft back-and-forth in the axial direction with respect to the female shaft a plurality of times.

7. The manufacturing method for a telescopic shaft according to claim 1, wherein a sliding speed, a sliding surface pressure and a sliding distance, which causes the male shaft to slide back-and-forth in the axial direction with respect to the female shaft, are changed according to the value of the sliding resistance after the male shaft has been caused to relatively slide back-and-forth in the axial direction with respect to the female shaft a specified number of times.

8. The manufacturing method for a telescopic shaft according to claim 1, wherein during the sliding, the male shaft is caused to relatively slide back-and-forth in the axial direction with respect to the female shaft, while heating the coated section with a heating apparatus.

* * * * *